(No Model.)
S. J. BESTHOFF.
CINDER SHOVEL.
No. 510,765. Patented Dec. 12, 1893.
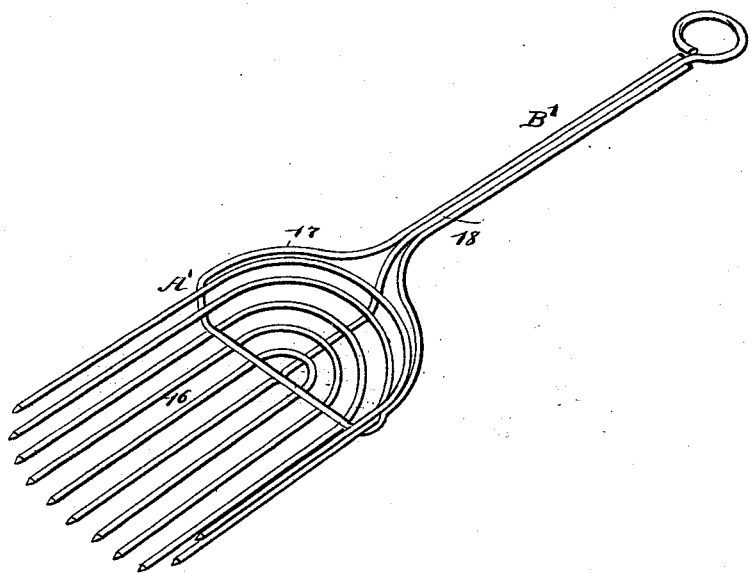
WITNESSES:
John A. Rennie
C. Sedgwick
INVENTOR
S. J. Besthoff
BY
Munn & Co
ATTORNEYS.

UNITED STATES PATENT OFFICE.

SAMUEL J. BESTHOFF, OF NEW YORK, N. Y.

CINDER-SHOVEL.

SPECIFICATION forming part of Letters Patent No. 510,765, dated December 12, 1893.

Application filed March 6, 1893. Serial No. 464,749. (No model.)

*To all whom it may concern:*

Be it known that I, SAMUEL J. BESTHOFF, of New York city, in the county and State of New York, have invented a new and Improved Cinder-Shovel, of which the following is a full, clear, and exact description.

My invention relates to an improvement in shovels, and it has for its object to provide a shovel especially adapted for removing cinders from grates, fire-places, stoves and other places or receptacles in which coal is consumed, the shovel being so constructed that as the coals or cinders are received in the shovel the dust or ashes will drop from the shovel, leaving the coals or cinders grouped therein, and in condition to be assorted and placed in any convenient receptacle.

The invention consists in the novel construction and combination of the several parts, as will be hereinafter fully set forth and pointed out in the claims.

Reference is to be had to the accompanying drawing forming a part of this specification, in which my improved shovel is shown in perspective.

As shown in the drawing my improved shovel which comprises the body A' and handle B' is constructed of wires or metal rods arranged in concentric series, those in the body being practically U-shaped and designated as 16, while the rods in the handle are essentially straight, the outer section of the handle, however, being formed with a yoke 17, for attachment to the series of U-bars forming the body, and by means of this yoke the several U-bars of the body are held together, being soldered, riveted, or otherwise attached to the said yoke, while a central bar 18 of the handle, as the handle ordinarily consists of three bars, is carried downward longitudinally beneath the bottom of the body and constitutes the center prong or tine thereof; and this central rod of the handle also serves to connect the various rods of the body, as it crosses them all, and may be riveted, soldered or otherwise attached to them.

The handle B', may be given any desired shape, and the body A' is given the formation of an ordinary shovel. The ends of the tines or the members of the U-bars, and likewise the lower end of the central handle bar, are preferably rendered somewhat sharp or pointed, but they may be flattened to have a chisel-like edge, or they may be simply rounded off or left perfectly straight at their ends, as in practice may be found most desirable.

In this form of shovel, ashes cannot be removed by means of it. It is simply adapted for removing cinders and coals, and so separating them from the ashes; the shovel is introduced into a pile of ashes and cinders, for example, until it is filled. It is then lifted and gently vibrated or shaken until all the ashes have dropped down through the openings in the body of the shovel, the coal and cinders remaining therein, as the space between the U-bars of the body need not be very great.

Having thus described my invention, I claim as new and desire to secure by Letters Patent—

1. A shovel comprising a series of concentric U shape tines 16, a handle having a longitudinal tang rigidly connecting the U shape tines at their bends and a transverse wire or bar rigidly connecting the U shape tines in front of their bends and also crossing and rigidly connected to the said tang in front of the bend of the innermost tine 16, substantially as set forth.

2. A shovel comprising a series of concentric U shape tines 16, a handle constructed of a wire formed at its outer ends into a yoke 17 having a transverse bar or member rigidly connecting the U shape tines in front of their bends the said wire extending rearward from the yoke in straight parallel sections to form the handle proper and a middle tang-forming wire 18 extending from the handle B' downwardly and forwardly under and rigidly connected to the several tines at their bends and also rigidly connected to the said cross bar of the yoke in front of the bend of the middle tine and continuing forwardly to the end of the shovel and forming a single middle tine, substantially as set forth.

SAMUEL J. BESTHOFF.

Witnesses:
J. FRED. ACKER,
E. M. CLARK.